(12) United States Patent
Petrisor

(10) Patent No.: US 8,487,483 B2
(45) Date of Patent: Jul. 16, 2013

(54) INFLIGHT ENTERTAINMENT SYSTEM POWER PROVISIONING

(75) Inventor: Gregory C. Petrisor, Los Angeles, CA (US)

(73) Assignee: Lumexis Corporation, Irvine, CA (US)

( * ) Notice: Subject to any disclaimer, the term of this patent is extended or adjusted under 35 U.S.C. 154(b) by 493 days.

(21) Appl. No.: 12/927,493

(22) Filed: Nov. 16, 2010

(65) Prior Publication Data

US 2011/0115286 A1 May 19, 2011

Related U.S. Application Data

(60) Provisional application No. 61/281,350, filed on Nov. 16, 2009.

(51) Int. Cl.
*H01B 7/30* (2006.01)

(52) U.S. Cl.
USPC .............................................. 307/147; 307/9.1

(58) Field of Classification Search
USPC ................................................... 307/9.1, 147
See application file for complete search history.

*Primary Examiner* — Robert L. DeBeradinis
(74) *Attorney, Agent, or Firm* — Scot A. Reader

(57) ABSTRACT

An inflight entertainment (IFE) system receives power from a multiple of power supply units that each supply power to passenger seats in a multiple of multi-seat groups, wherein different power supply units supply power to adjacent passenger seats in each multi-seat group. The IFE system exhibits reduced power supply unit costs and incurs lower operational penalties in the event a power supply unit fails, and is particularly well suited for a wide body aircraft wherein flight attendant call buttons are integral with the IFE system. For example, where flight attendant call buttons are integral with the IFE system and a power supply unit fails in the present arrangement, every passenger still has access to a flight attendant call button associated with an adjacent seat, which can remove the requirement that passengers be relocated or moved to another flight in order for the aircraft to depart.

20 Claims, 3 Drawing Sheets

INFLIGHT ENTERTAINMENT SYSTEM POWER PROVISIONING

CROSS-REFERENCE TO RELATED APPLICATION

This application claims the benefit of U.S. provisional application No. 61/281,350 entitled "INFLIGHT ENTERTAINMENT SYSTEM POWER PROVISIONING," filed on Nov. 16, 2009, the contents of which are incorporated herein by reference.

BACKGROUND OF THE INVENTION

Inflight entertainment (IFE) systems have evolved significantly over the last 25 years. Prior to 1978, IFE systems consisted of audio-only systems. In 1978, Bell and Howell (Avicom Division) introduced a group viewing video system based on VHS tapes. In 1988, Airvision introduced the first in-seat video system allowing passengers to choose between several channels of broadcast video. In 1997, Swissair installed the first interactive video on demand (VOD) system. Currently, several IFE systems provide VOD with full digital video disc-like controls.

Some airlines require that each passenger have access to a flight attendant call button upon departure. Flight attendant call buttons are part of the passenger safety system which airlines may include in their minimum operating equipment list filed with the Federal Aviation Administration (FAA). On narrow body aircraft, flight attendant call buttons are generally mounted overhead in the cabin ceiling and are completely independent of the IFE system. On wide body aircraft, however, the cabin ceiling is typically too high for a passenger to reach. Therefore, on wide body aircraft, flight attendant call buttons are often incorporated into the IFE system as part of passenger control units mounted in passenger seats.

A consequence of integrating flight attendant call buttons with the IFE system on wide body aircraft is that flight attendant call buttons rely on IFE system power. Thus, if an IFE system power supply unit fails, the flight attendant call button at every passenger seat that relies on that power supply unit will not work. In that event, the cabin crew may relocate the impacted passengers to unused seats or, in the event an insufficient number of seats are available, may ask for volunteers to move to a later flight for some reward.

Since relocation and removal of passengers is inconvenient, time consuming and costly, on wide body aircraft a power supply unit is typically distributed to every triple seat group to minimize the impact of failure of a single power supply unit. FIG. 1 illustrates conventional power distribution for an IFE system on a wide body aircraft 100. A power supply unit is dedicated to each triple seat group. For example, triple seat group 110 consists of three seats 111A, 111B, 111C mounted to a common frame. A power supply unit 112 is dedicated to triple seat group 110. Power supply unit 112 converts aircraft power to local power and distributes local power to seats 111A, 111B, 111C via a power cable 113 for use by the IFE electronics at seats 111A, 111B, 111C. If power supply unit 112 fails, the cabin crew may relocate the three impacted passengers to unused seats, or if an insufficient number of seats is available, may ask for volunteers to move to another flight for some reward. Still, as long as the other triple seat group power supply units remain operative, the inconvenience, delay and cost caused by this failure is limited.

Nonetheless, the conventional wide body aircraft power provisioning shown in FIG. 1 has certain drawbacks. First, dedicating a power supply unit to each triple seat group is very costly. For example, 60 power supply units are required in wide body aircraft 100 shown in FIG. 1. Second, even though the disruption resulting from failure of a single power supply unit is limited, as many as three passengers are still impacted by each such failure.

In a narrow body aircraft in which flight attendant call buttons are decoupled from the IFE system, IFE systems with more efficient power distribution have been deployed. FIG. 2 illustrates a conventional approach to power provisioning for an IFE system on a narrow body aircraft 200. Triple seat groups are organized into power zones each consisting of five triple seat groups. In all, there are 12 power zones (labeled A-L). Power zone G is shown in greater detail to better illustrate power provisioning. A single power supply unit 212 provides power for the power zone, which consists of five triple seat groups each having three seats (e.g., 211A, 211B, 211C). Power is distributed both between triple seat groups and to individual seats through power cable 213. By dedicating one power supply unit for 15 seats, the number of power supply units deployed on aircraft 200 is reduced from 60 to 12 relative to the wide body aircraft shown in FIG. 1, significantly reducing power supply costs for the IFE system. However, if this power distribution system were deployed on a wide body aircraft where flight attendant call buttons are integral with the IFE system, failure of a single power supply unit could require relocating as many as 15 passengers or finding up to 15 volunteers to switch to another flight, causing a major operational disruption.

SUMMARY OF THE INVENTION

The present invention provides an IFE system that is particularly well suited for a wide body aircraft wherein flight attendant call buttons are integral with the IFE system. The IFE system exhibits reduced power supply unit costs and incurs lower operational penalties in the event a power supply unit fails. The foregoing advantages are achieved by having the IFE system receive power from a multiple of power supply units that each supply power to passenger seats in a multiple of multi-seat groups, but wherein different power supply units supply power to adjacent passenger seats in each multi-seat group. Thus, if a power supply unit fails, every passenger still has access to a flight attendant call button associated with an adjacent seat. This provides a measure of redundancy for each passenger in terms of access to fight attendant call buttons and can remove the requirement that passengers be relocated or moved to another flight in order for the aircraft to depart in the event the airline listed the passenger safety system as part of its minimum operating equipment filed with the FAA.

In one aspect of the invention, an IFE system comprises a plurality of IFE nodes associated with a respective plurality of passenger seats in a plurality of multi-seat groups, and a plurality of power supply units, wherein each of the power supply units supplies power to at least one of the IFE nodes in each of the multi-seat groups, and wherein the IFE nodes associated with adjacent passenger seats in each of the multi-seat groups are supplied power by different ones of the power supply units.

In another aspect of the invention, an IFE system comprises a first power zone having a plurality of first zone IFE nodes associated with a respective plurality of first zone passenger seats in a plurality of first zone multi-seat groups and a plurality of first zone power supply units, wherein each of the first zone power supply units supplies power to at least one of the first zone IFE nodes in each of the first zone multi-seat groups, and wherein the first zone IFE nodes associated with adjacent passenger seats in each of the first zone multi-seat groups are supplied power by different ones of the first zone power supply units; and a second power zone having a plurality of second zone IFE nodes associated with a respective plurality of second zone passenger seats in a plurality of second zone multi-seat groups and a plurality of second zone power supply units, wherein each of the second zone power supply units supplies power to at least one of the second zone IFE nodes in each of the second zone multi-seat groups, and wherein the second zone IFE nodes associated with adjacent passenger seats in each of the second zone multi-seat groups are supplied power by different ones of the second zone power supply units.

In some embodiments, the IFE system is installed on a wide body aircraft.

In some embodiments, each IFE node has a flight attendant call button.

In some embodiments, the flight attendant call button is part of a passenger control unit mounted to an armrest of a passenger seat with which the IFE node is associated.

In some embodiments, the flight attendant call button is part of a video display unit mounted to a seatback of the seat in front of a passenger seat with which the IFE node is associated.

In some embodiments, each IFE node has an input/output device.

In some embodiments, the input/output device provides video on demand services.

In some embodiments, the multi-seat groups are triple seat groups.

In some embodiments, the triple seat groups each comprise a window seat, a middle seat and an aisle seat.

In some embodiments, none of the second zone power supply units is a first zone power supply unit.

In some embodiments, at least one of the second zone power supply units is a first zone power supply unit.

These and other aspects will be better understood by reference to the following detailed description taken in conjunction with the drawings that are briefly described below. Of course, the invention is defined by the appended claims.

DETAILED DESCRIPTION OF A PREFERRED EMBODIMENT

Figure 3:
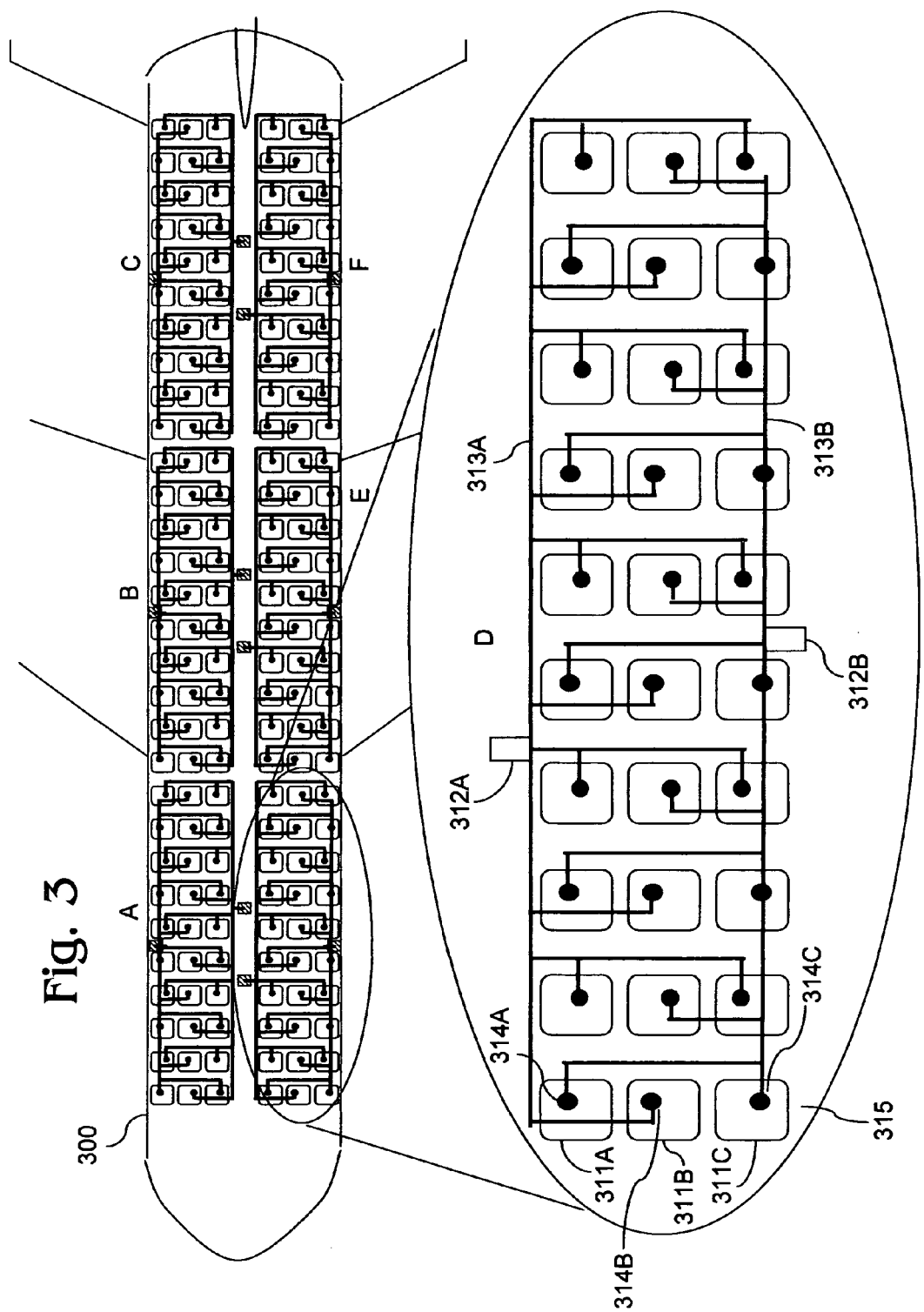
FIG. 3 shows a wide body aircraft having an IFE system that has reduced power supply unit costs and incurs lower operational penalties in the event a power supply unit fails in some embodiments of the invention.

FIG. 3 shows a wide body aircraft 300 having an IFE system that exhibits reduced power supply unit costs and incurs lower operational penalties in the event a power supply unit fails in some embodiments of the invention. The IFE system includes a plurality of IFE nodes associated with a respective plurality of passenger seats in a plurality of triple seat groups. For example, IFE nodes 314A, 314B, 314C are associated with passenger seats 311A, 311B, 311C, respectively, in triple seat group 315. Each triple seat group is mounted on a common frame. Each IFE node includes a flight attendant call button as well as one or more input/output devices that provide IFE services, such as video on demand.

In some embodiments, the flight attendant call button is part of a passenger control unit mounted to an armrest of the passenger seat with which the IFE node is associated. In other embodiments, the flight attendant call button is part of a video display unit mounted to a seatback of the seat in front of the passenger seat with which the IFE node is associated.

Figure 1:
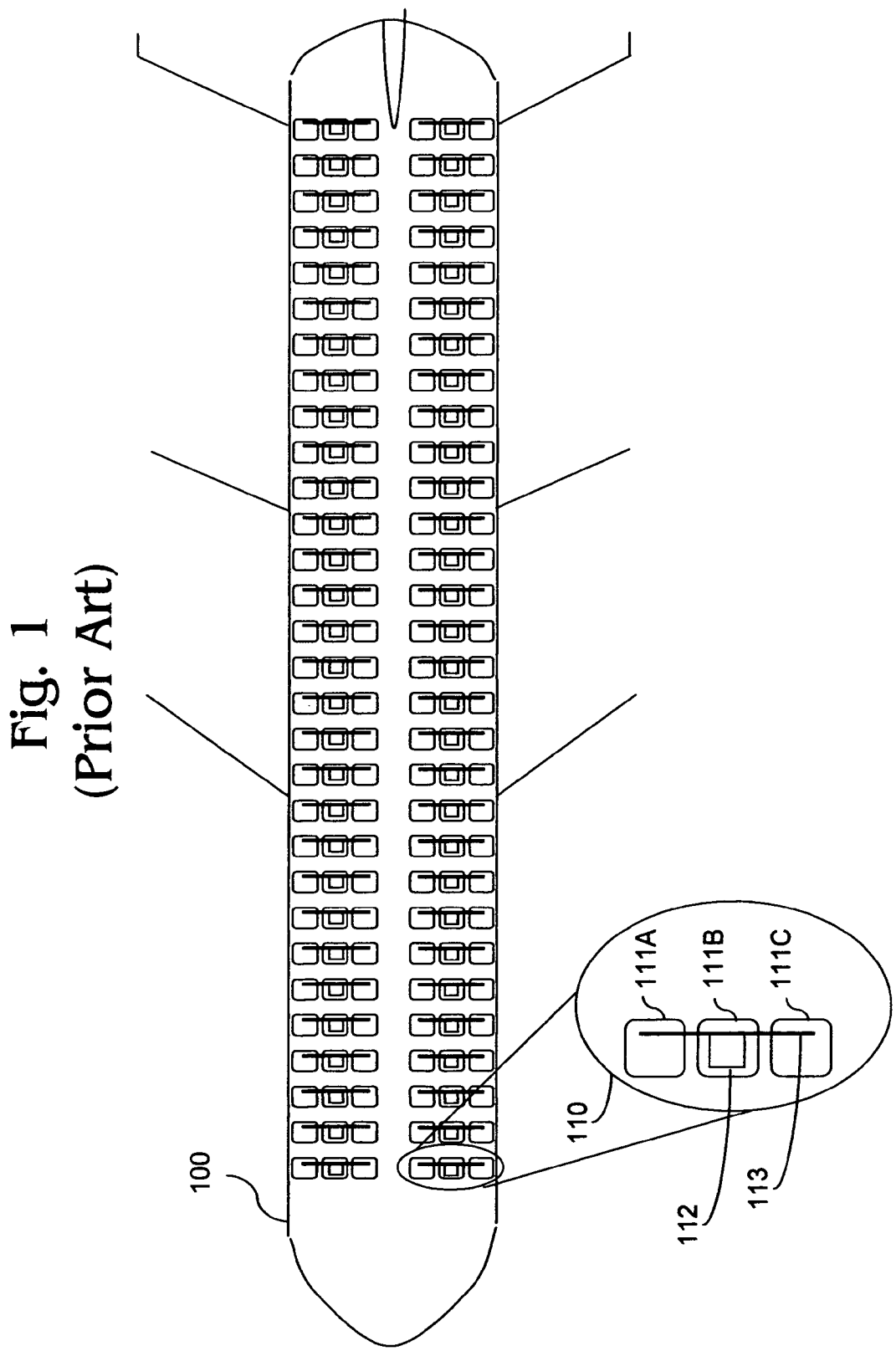
FIG. 1 shows a wide body aircraft having an IFE system with conventional power provisioning.
Figure 2:
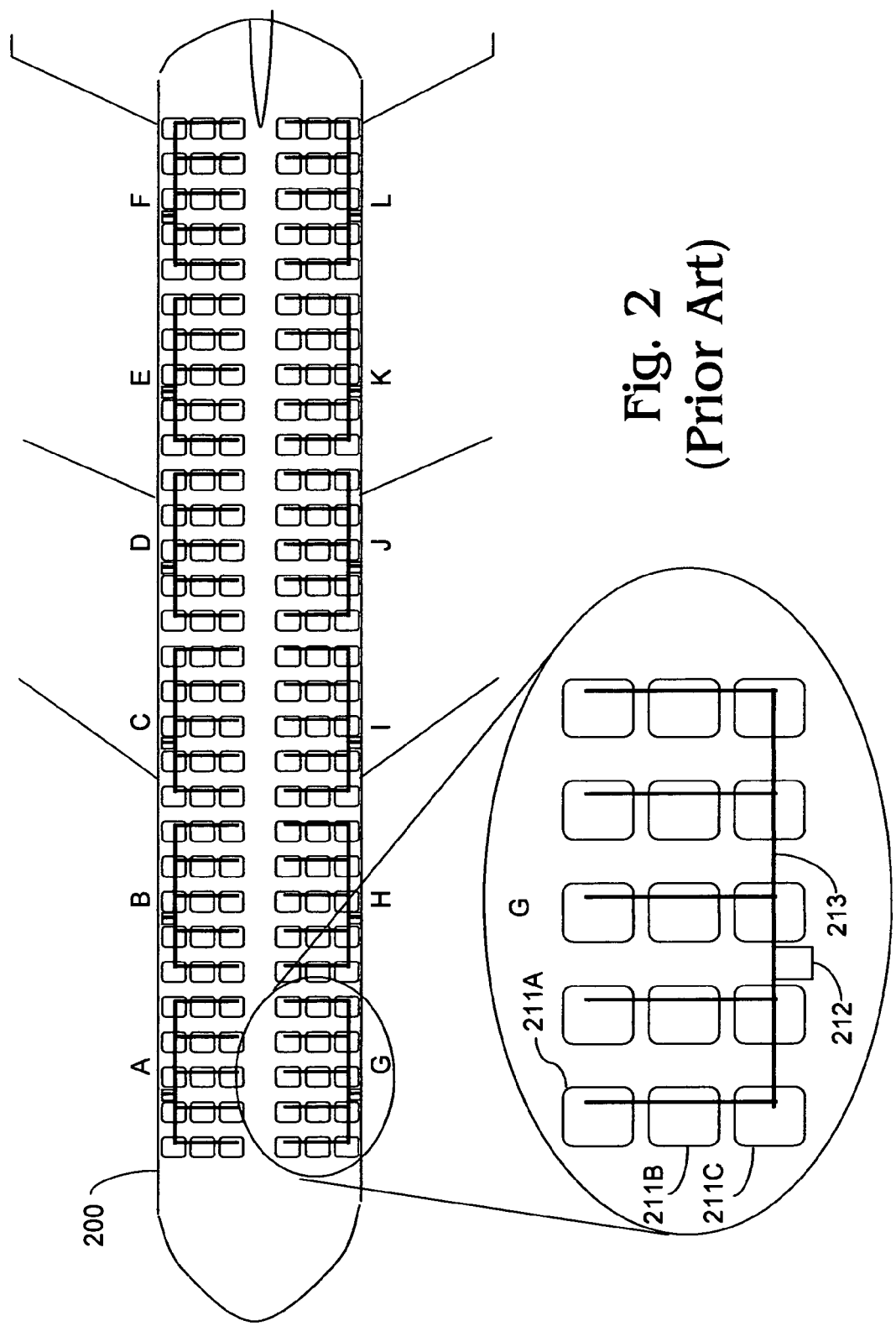
FIG. 2 shows a narrow body aircraft having an IFE system with conventional power provisioning.

The IFE system is divided into six power zones (A through F) each spanning 10 triple seat groups. Each power zone has two power supply units. Each of the power supply units in a power zone supplies power to at least one of the IFE nodes in each of the triple seat groups within the power zone. For example, power zone D includes power supply units 312A and 312B. In the first triple seat group 315 within power zone D, power supply unit 312A supplies power via power cable 313A to IFE node 314B associated with passenger seat 311B; in the second triple seat group within power zone D, power supply unit 312A supplies power via power cable 313A to two IFE nodes; in the third triple seat group within power zone D, power supply unit 312A supplies power via power cable 313A to one IFE node, and so on. Similarly, in the first triple seat group 315 within power zone D, power supply unit 312B supplies power via power cable 313B to IFE nodes 314A and 314C associated with passenger seats 311A and 311C, respectively; in the second triple seat group within power zone D, power supply unit 312B supplies power via power cable 313B to one IFE node; in the third triple seat group within power zone D, power supply unit 312B supplies power via power cable 313B to two IFE nodes, and so on. Thus, the number of power supply units is substantially reduced relative to the IFE system shown in FIG. 1 that utilizes conventional wide body aircraft power provisioning.

Moreover, the IFE nodes associated with adjacent passenger seats in each of the triple seat groups of a power zone are supplied power by different ones of the power supply units. For example, in the first triple seat group 315 within power zone D, power supply unit 312A supplies power via power cable 313A to IFE node 314B associated with middle passenger seat 311B, whereas power supply unit 312B supplies power via power cable 313B to IFE nodes 314A and 314C associated with aisle passenger seat 311A and window passenger seat 311C, respectively. In the second triple seat group within power zone D, power supply unit 312A supplies power via power cable 313A to IFE nodes associated with the aisle and window passenger seats, whereas power supply unit 312B supplies power via power cable 313B to the IFE node associated with the middle passenger seat. In the third triple seat group within power zone D, power supply unit 312A supplies power via power cable 313A to the IFE node associated with the middle passenger seat, whereas power supply unit 312B supplies power via power cable 313B to the aisle and window passenger seats, and so on. Thus, if a power supply unit fails, every passenger retains access to a flight attendant call button associated with an adjacent seat, which provides a measure of redundancy for every passenger in terms of access to flight attendant call buttons and can eliminate the need to relocate passengers or have them deplane in order for the aircraft to depart for airlines that have included the passenger safety system in their minimum operating equipment list filed with the FAA.

In other embodiments, a single power supply unit may participate in multiple power zones. Thus, for example, a first power zone A may be powered by a first and a second power supply unit, a second power zone B may be powered by the second and a third power supply unit, a third power zone C may be powered by the third and a fourth power supply unit, and so on. These embodiments allow power supplies to be more evenly distributed throughout the cabin. As in the previously discussed embodiments, each of the power supply units supplies power to at least one of the IFE nodes in each of the triple seat groups within the power zones in which it participates, and the IFE nodes associated with adjacent passenger seats in each of the triple seat groups of a power zone are supplied power by different ones of the power supply units.

It will be appreciated by those of ordinary skill in the art that the invention can be embodied in other specific forms without departing from the spirit or essential character hereof. The present description is therefore considered in all respects to be illustrative and not restrictive. The scope of the invention is indicated by the appended claims, and all changes that come within the meaning and range of equivalents thereof are intended to be embraced therein.

What is claimed is:

1. An inflight entertainment (IFE) system, comprising:
   a plurality of WE nodes associated with a respective plurality of passenger seats in a plurality of multi-seat groups; and
   a plurality of power supply units, wherein each of the power supply units supplies power to at least one of the IFE nodes in each of the multi-seat groups, and wherein the IFE nodes associated with adjacent passenger seats in each of the multi-seat groups are supplied power by different ones of the power supply units.

2. The IFE system of claim 1, wherein the IFE system is installed on a wide body aircraft.

3. The IFE system of claim 1, wherein each IFE node has a flight attendant call button.

4. The IFE system of claim 3, wherein the flight attendant call button is part of a passenger control unit mounted to an armrest of a passenger seat with which the IFE node is associated.

5. The IFE system of claim 3, wherein the flight attendant call button is part of a video display unit mounted to a seatback of the seat in front of a passenger seat with which the IFE node is associated.

6. The IFE system of claim 1, wherein each IFE node has an input/output device.

7. The IFE system of claim 6, wherein the input/output device provides video on demand services.

8. The WE system of claim 1, wherein the multi-seat groups are triple seat groups.

9. The IFE system of claim 8, wherein the triple seat groups each comprise a window seat, a middle seat and an aisle seat.

10. An IFE system, comprising:
    a first power zone having a plurality of first zone IFE nodes associated with a respective plurality of first zone passenger seats in a plurality of first zone multi-seat groups;
    a plurality of first zone power supply units, wherein each of the first zone power supply units supplies power to at least one of the first zone IFE nodes in each of the first zone multi-seat groups, and wherein the first zone IFE nodes associated with adjacent passenger seats in each of the first zone multi-seat groups are supplied power by different ones of the first zone power supply units;
    a second power zone having a plurality of second zone IFE nodes associated with a respective plurality of second zone passenger seats in a plurality of second zone multi-seat groups; and
    a plurality of second zone power supply units, wherein each of the second zone power supply units supplies power to at least one of the second zone IFE nodes in each of the second zone multi-seat groups, and wherein the second zone IFE nodes associated with adjacent passenger seats in each of the second zone multi-seat groups are supplied power by different ones of the second zone power supply units.

11. The IFE system of claim 10, wherein the IFE system is installed on a wide body aircraft.

12. The IFE system of claim 10, wherein each IFE node has a flight attendant call button.

13. The IFE system of claim 12, wherein the flight attendant call button is part of a passenger control unit mounted to an armrest of a passenger seat with which the IFE node is associated.

14. The IFE system of claim 12, wherein the flight attendant call button is part of a video display unit mounted to a seatback of the seat in front of a passenger seat with which the IFE node is associated.

15. The IFE system of claim 10, wherein each IFE node has an input/output device.

16. The IFE system of claim 15, wherein the input/output device provides video on demand services.

17. The IFE system of claim 10, wherein the multi-seat groups are triple seat groups.

18. The IFE system of claim 17, wherein the triple seat groups each comprise a window seat, a middle seat and an aisle seat.

19. The IFE system of claim 10, wherein none of the second zone power supply units is a first zone power supply unit.

20. The IFE system of claim 10, wherein at least one of the second zone power supply units is a first zone power supply unit.

* * * * *

UNITED STATES PATENT AND TRADEMARK OFFICE
CERTIFICATE OF CORRECTION

PATENT NO. : 8,487,483 B2  
APPLICATION NO. : 12/927493  
DATED : July 16, 2013  
INVENTOR(S) : Gregory C. Petrisor Page 1 of 1

It is certified that error appears in the above-identified patent and that said Letters Patent is hereby corrected as shown below:

In the Claims:

Column 5, line 21, "WE" is replaced with --IFE--.

Column 5, line 46, "WE" is replaced with --IFE--.

Signed and Sealed this  
Seventeenth Day of September, 2013

Teresa Stanek Rea  
*Deputy Director of the United States Patent and TrademarkOffice*